(No Model.)

H. TIMKEN & R. HEINZELMAN.
ROLLER BEARING FOR VEHICLES.

No. 606,635. Patented June 28, 1898.

Witnesses:
David Attelson
T. Percy Barr

Inventors
Henry Timken and
Reginald Heinzelman,
by Carr & Carr, Attys.

THE NORRIS PETERS CO., PHOTO-LITHO., WASHINGTON, D. C.

United States Patent Office.

HENRY TIMKEN AND REGINALD HEINZELMAN, OF ST. LOUIS, MISSOURI, ASSIGNORS OF ONE-HALF TO WILLIAM R. TIMKEN AND HENRY H. TIMKEN, OF SAME PLACE.

ROLLER-BEARING FOR VEHICLES.

SPECIFICATION forming part of Letters Patent No. 606,635, dated June 28, 1898.

Application filed August 27, 1897. Serial No. 649,738. (No model.)

*To all whom it may concern:*

Be it known that we, HENRY TIMKEN and REGINALD HEINZELMAN, citizens of the United States, residing in the city of St. Louis and State of Missouri, have invented a new and useful Roller-Bearing for Vehicles, of which the following is a specification.

Our invention relates to roller-bearings for vehicles, and has for its principal objects to reduce the friction, to provide for the adjustment of the roller-bearings, to provide for the removal of the wheel from the spindle without affecting the roller-bearings, and generally to improve the construction of roller-bearings.

Our invention consists in the parts and in the arrangements and combinations of parts hereinafter described and claimed.

Figure 1:
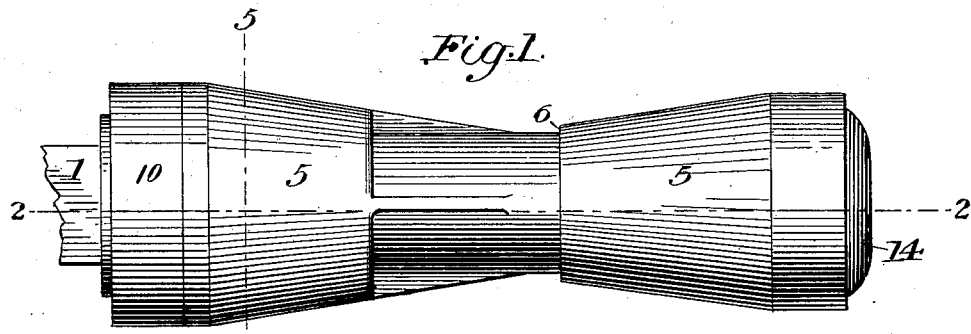
Figure 2:
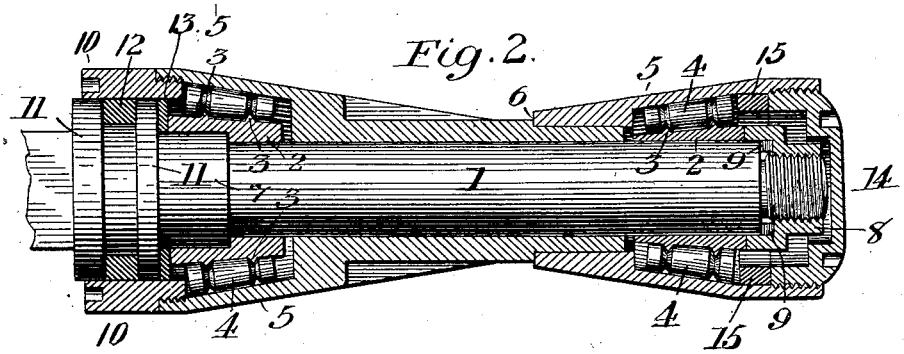
Figure 3:
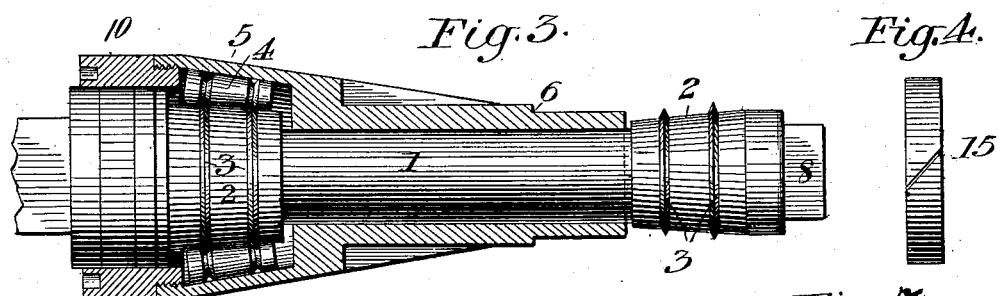
Figure 4:
Figure 6:
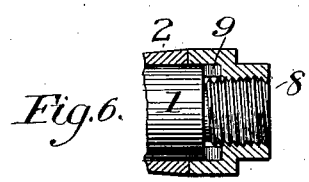
Figure 5:
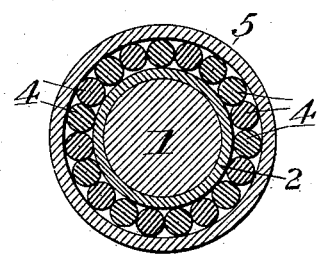
Figure 7:
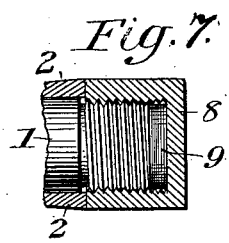

In the accompanying drawings, which form part of this specification, Figure 1 is a side view of a roller-bearing adapted to be incorporated into the hub of a wheel. Fig. 2 is a longitudinal section thereof on the line 2 2 of Fig. 1 with the axle shown in elevation. Fig. 3 is a longitudinal section of the roller-box and a side elevation of all inside thereof. Fig. 4 is a detail view of the split ring hereinafter mentioned. Fig. 5 is a cross-section on the line 5 5 of Fig. 1. Fig. 6 is a detail view of the adjusting-nut and washers, and Fig. 7 is a like detail of a modified form thereof.

Like symbols refer to like parts wherever they occur.

Near the end of the axle or spindle 1 and fitting thereon is a conical sleeve 2, provided with annular ribs 3 on its outer surface. Around this conical sleeve conical rollers 4 are provided, so as to bear thereon, and each roller is provided with grooves to correspond with the ribs on the sleeve, whereby the ribs lie in such grooves. Outside of the rollers and arranged to bear against them is a conical shell or box 5, incorporated into the outer end of the wheel.

The arrangement of the conical sleeve, rollers, and box just described is duplicated at the inner end of the wheel's hub. The conical box at the inner end of the hub has a cylindrical sleeve extending through the hub and adapted to receive the outer conical shell. A shoulder 6 on said sleeve, against which the end of the other shell abuts, keeps said shells a fixed distance apart.

The conical sleeve at the inner end abuts endwise against a shoulder 7 on the axle and is thereby prevented from going farther inwardly. The end of the axle or spindle 1 is screw-threaded and has a nut 8 working thereon, said nut having an enlarged annular extension adapted to surround the axle and abut against the end of the conical sleeve 2. When the nut 8 is tightened, the conical shell at the outer end of the hub is forced inwardly, while the shell at the other end remains stationary against the shoulder on the axle. The inward movement of the outer sleeve is distributed through the intermediate parts of the two bearings, bringing such parts closer together, and thus adjusting the bearings at both ends of the hub simultaneously. This provision for adjustment is equally applicable to other bearings than those of the conical form shown herein.

For the purpose of making the adjustment simple and reliable the threaded end of the axle is made of reduced diameter, so as to leave a shoulder of sufficient bearing-surface to accommodate an annular washer mounted on the reduced portion. A series of very thin washers 9 is originally mounted on the reduced portion of the axle in position to be covered by the extending annular portion of the nut. When the bearing becomes worn, the washers are removed one at a time to provide a new adjustment. This method of adjustment is quite delicate and is capable of being used by inexperienced persons and has the important advantage of preventing to a large degree the loosening of the nut. A modified form of this adjustment is shown in Fig. 7, wherein the threaded hole is cut only part way through the nut, and thus constitutes a socket, and the diameter of the axle is not reduced, but the thin washers or rather disks 9 lie in the socket of the nut and bear against the end of the axle instead of against a shoulder thereon.

At the inner end of the hub the dust is prevented from getting into the bearings by a ring 10, threaded to work on a thread cut in the inner surface of the conical box. The inner surface of this ring fits over two annular ribs 11 on the axle and a washer 12 between them. Another washer 13, of felt or other suitable material, is located at the end of the conical sleeve inside of said dust-ring. When the wheel is removed from the axle, the dust-ring prevents the rollers from falling out of place.

A dust-cap 14 is screwed into the end of the conical box at the end of the axle. As this dust-cap covers the end of the axle and the nut thereon and must therefore be removed to take off the wheel, a split ring 15 is fitted into the conical box in position to keep the rollers from falling out when the wheel is removed.

The conical sleeves, rollers, and boxes are incorporated into the hub of the wheel and are mounted and removed from the axle along with the wheel. The boxes are fixed to the hub and turn therewith; but the conical sleeves remain stationary on the axle, the friction being reduced by the rolling contact of the conical rollers. The tendency of the rollers to twist or shift out of position is counteracted by the ribs on the sleeves. These ribs are not high enough to bear normally on the surface of the grooves, their function being to prevent the rollers from coming out endwise, to prevent twisting, to advance or retract the rollers evenly in the adjustment of the bearing, and to assist in resisting the lateral movement or side thrust of the axle. When the bearing-surface becomes worn, a new adjustment is made, as hereinbefore mentioned, by removing one of the thin washers 9 and again tightening the nut at the end of the axle. It is noted that in the adjustment of the bearing the endwise movement of the rollers is effected by the sleeve through the goove-and-rib connection and that the ends of the rollers are at all times free from contact with other parts, and thus are always free from friction at their ends. The nut thus serving as an adjusting-nut is the same which fastens the wheel on the axle.

Our invention is of general use as a journal-bearing and admits of divers changes and modifications in construction, and we do not wish to be limited to its use for vehicles or to the specific construction shown in the drawings. For instance, the annular ribs may be arranged on the inner surface of the roller-boxes instead of on the sleeves, or the ribs may be formed on the rollers and the grooves in either the boxes or the sleeves. Obviously, also, the inner bearing-surface may be integral with the axle instead of a separate sleeve, and the outer box may likewise be formed in the body of the hub instead of separate therefrom.

What we claim is—

1. A bearing comprising a sleeve fitting on the axle and movable longitudinally thereon and having an annular rib, rollers around said sleeve provided with a groove fitting over said rib, and a box fitting over said rollers, and means for adjusting said sleeve whereby all of said rollers may be advanced and retracted evenly and in operation are without friction on their ends, substantially as and for the purpose set forth.

2. A bearing comprising a sleeve fitting on the axle and movable longitudinally thereon and having annular ribs, rollers around said sleeve provided with grooves fitting over said ribs, and a box fitting over said rollers, and means for adjusting said sleeve whereby all of said rollers may be advanced and retracted evenly and in operation are without friction on their ends, substantially as and for the purpose set forth.

3. A bearing comprising a sleeve fitting on the axle and movable longitudinally thereon and having an annular rib or ribs, rollers around said sleeve provided with a groove or grooves fitting over said rib or ribs, and a box fitting over said rollers, said axle having its end reduced and threaded, and a nut on said threaded end having an enlarged annular projection adapted to bear against said sleeve, and thin washers intervening between said nut and the shoulder of said axle, whereby all of said rollers may be advanced and retracted evenly and in operation are without friction on their ends, substantially as and for the purpose set forth.

4. A bearing comprising a bearing-cone, conical rollers thereon and a conical box fitting over said rollers, each of said rollers having a plurality of grooves, and ribs on one of the bearing-surfaces to coöperate therewith, substantially as and for the purpose set forth.

5. A vehicle-bearing comprising a conical shell fitting on the axle, conical rollers on said shell and a conical box fixed to the hub of the wheel and bearing on said rollers, said shell having a plurality of annular ribs and said rollers each having a plurality of grooves to coöperate therewith, substantially as and for the purpose set forth.

6. A vehicle-bearing comprising two conical shells fitting on the axle and tapering toward each other, conical rollers around said shells, and conical boxes in the hub of the wheel and fitting around said rollers, each of said rollers having a plurality of grooves therein and one of said bearing-surfaces having ribs projecting into said grooves, substantially as and for the purpose set forth.

7. A vehicle-bearing comprising two relatively-adjustable conical shells fitting on the axle and tapering toward each other, conical rollers around said shells, and conical boxes in the hub of the wheel and fitting around said rollers, said shells having one or more annular ribs and said rollers having grooves to receive said ribs, whereby all of said rollers may be advanced and retracted evenly and in operation are free from friction on their ends, substantially as and for the purpose set forth.

8. A vehicle-bearing comprising two conical shells fitting on the axle and tapering toward each other, conical rollers around said shells, and conical boxes in the hub of the wheel and fitting around said rollers, said shells having a plurality of annular ribs and said rollers having grooves adapted to receive said ribs, and means for adjusting said shells simultaneously, substantially as and for the purpose set forth.

9. A vehicle-bearing comprising two conical shells longitudinally movable on the axle and tapering toward each other, each provided with a groove or grooves to coöperate with said rib or ribs, conical rollers around said shells, and conical boxes fixed to the hub of the wheel, said axle having a shoulder against which one of said shells abuts and having a threaded end and a nut thereon, said nut being arranged to bear against the other shell, whereby, when said nut is tightened, all of said rollers may be advanced evenly and in operation are free from friction on their ends, substantially as and for the purpose set forth.

HENRY TIMKEN.
REGINALD HEINZELMAN.

Signed by Henry Timken August 11, 1897, in presence of—
WM. HAHN,
CHRISTIAN BAUER.

Signed by Reginald Heinzelman July 16, 1897, in presence of—
JAMES A. CANN,
HENRY H. TIMKEN.